United States Patent
Celik et al.

(10) Patent No.: US 9,461,776 B2
(45) Date of Patent: Oct. 4, 2016

(54) SELECTING A DATA UNIT FOR RETRANSMISSION

(75) Inventors: Zahide Ozlem Celik, Reading (GB); Song Ni, Waterloo (CA); Shuhratchon Shuhrat Ochilov, Kitchener (CA); Takashi Suzuki, Ichikawa (JP)

(73) Assignee: BlackBerry Limited, Waterloo, Ontario (CA)

( * ) Notice: Subject to any disclaimer, the term of this patent is extended or adjusted under 35 U.S.C. 154(b) by 581 days.

(21) Appl. No.: 13/359,883

(22) Filed: Jan. 27, 2012

(65) Prior Publication Data

US 2013/0194933 A1  Aug. 1, 2013

(51) Int. Cl.
*H04W 24/00* (2009.01)
*H04L 1/16* (2006.01)
*H04L 1/18* (2006.01)

(52) U.S. Cl.
CPC ............ *H04L 1/1685* (2013.01); *H04L 1/188* (2013.01)

(58) Field of Classification Search
None
See application file for complete search history.

(56) References Cited

U.S. PATENT DOCUMENTS

| 2006/0067238 A1 | 3/2006 | Olsson et al. | |
| 2011/0019756 A1* | 1/2011 | Chun et al. | 375/260 |
| 2011/0134930 A1* | 6/2011 | McLaren et al. | 370/401 |

FOREIGN PATENT DOCUMENTS

| WO | 2006118418 | 11/2006 |
| WO | 2008096259 | 8/2008 |
| WO | 2008134984 | 11/2008 |
| WO | 2008141016 | 11/2008 |
| WO | 2009029511 | 3/2009 |
| WO | 2009088348 | 7/2009 |
| WO | WO2010121371 | 10/2010 |
| WO | WO2011044679 | 4/2011 |

OTHER PUBLICATIONS

3GPP TS 36.322 V10.0.0 (Dec. 2010) 3rd Generation Partnership Project; Technical Specification Group Radio Access Network; Evolved Universal Terrestrial Radio Access (E-UTRA); Radio Link Control (RLC) protocol specification (Release 10) (39 pages).
Canadian Intellectual Property Office, Written Opinion and Search Report for International Appl. No. PCT/CA2013/050045, dated May 1, 2013, 10 pages.
3GPP TSG-RAN2#65 Meeting, Tdoc R2-091117, Change Request, 36.322, 8.4.0, Title: UE behaviour when T_poll_retransmit expires; Source of WG: Samsung, Nokia Corporation date Feb. 9-13, 2009 (2 pages).
3GPP TSG-RAN2#65 Meeting, Tdoc R2-091665, Change Request, 36.322, 8.4.0, Title: UE behaviour when T_poll_transmit expires; Source of WG: Samsung, Huawei Technologies, LG Electronics Inc., Nokia Corporation dated Feb. 9-13, 2009 (2 pages).
3GPP TS 36.321 V10.4.0, Technical Specification; 3rd Generation Partnership Project; Technical Specification Group Radio Access Network; Evolved Universal Terrestrial Radio Access (E-UTRA); Medium Access Control (MAC) protocol specification (Release 10) Dec. 2011 (54 pages).
3GPP TS 25.331 V10.6.0; Technical Specification; 3rd Generation Partnership Project; Technical Specification Group Radio Access Network; Radio Resource Control (RRC); Protocol specification (Release 10) Dec. 2011, pp. 1-899.
3GPP TS 25.331 V10.6.0; Technical Specification; 3rd Generation Partnership Project; Technical Specification Group Radio Access Network; Radio Resource Control (RRC); Protocol specification (Release 10) Dec. 2011, pp. 900-1885.

* cited by examiner

*Primary Examiner* — Rhonda Murphy
(74) *Attorney, Agent, or Firm* — Trop Pruner & Hu, P.C.

(57) ABSTRACT

An event is detected relating to failure to receive an acknowledgment of a particular data unit transmitted by the first wireless node. According to a predefined criterion, a data unit is selected from a plurality of unacknowledged data units for retransmission.

22 Claims, 5 Drawing Sheets

SELECTING A DATA UNIT FOR RETRANSMISSION

BACKGROUND

A mobile device is able to connect to a wireless access network to perform various different types of communications, such as to establish a call with another endpoint, to access websites, to perform text messaging, and so forth. To perform communications, data units are sent between the mobile device and a node (e.g. base station) in the wireless access network.

With some wireless protocols, an acknowledged mode of operation can be provided, in which a receiver (one of the mobile device and the wireless access network node) can send an acknowledgement of receipt of a data unit to a transmitter (the other of the mobile device and the wireless access network node) that sent the data unit for reliable communication. Use of an acknowledged mode of operation allows for selective retransmission of data units that have not been correctly received or decoded by the receiver.

BRIEF DESCRIPTION OF THE DRAWINGS

Some embodiments are described with respect to the following figures.

DETAILED DESCRIPTION

Figure 1:
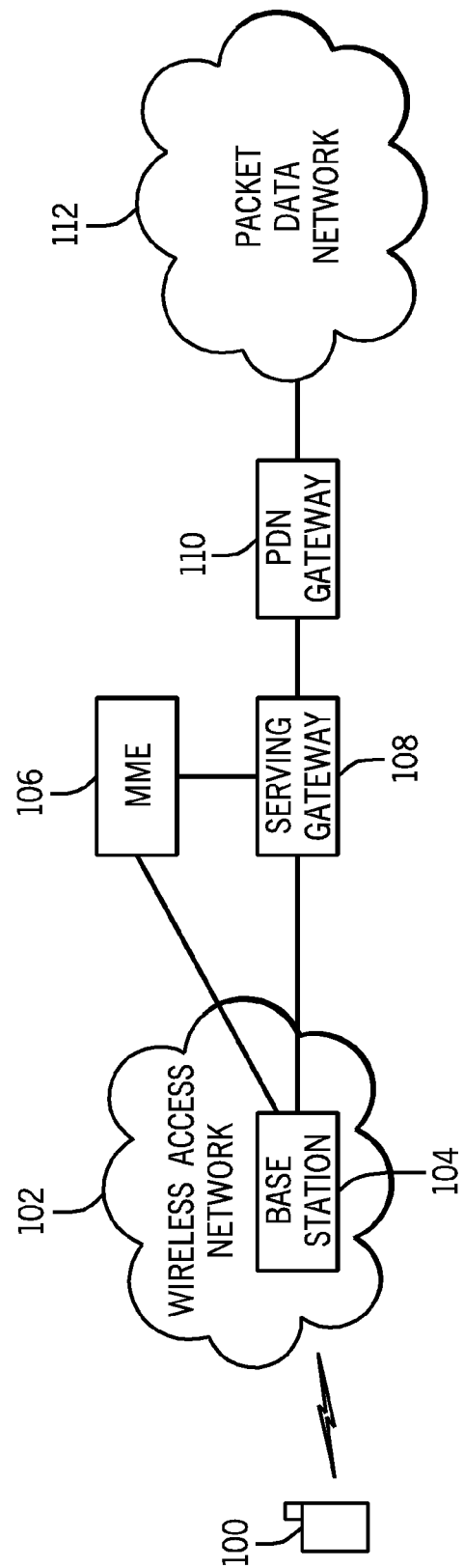
FIG. 1 is a block diagram of an example arrangement that includes a mobile communications network that incorporates some embodiments.

Various wireless access technologies have been proposed or implemented to enable mobile devices (e.g. desktop computers, notebook computers, tablet computers, personal digital assistants, smartphones, game devices, etc.) to perform communications with other endpoints. Examples of wireless access technologies include GSM (Global System for Mobile communications) and UMTS (Universal Mobile Telecommunications System) technologies, which are defined by the Third Generation Partnership Project (3GPP). Enhancements to the UMTS technology are provided by Long Term Evolution (LTE) standards from 3GPP. The LTE standards include the initial LTE standard as well as the LTE-Advanced standard. The LTE standards are also referred to as the EUTRA (Evolved Universal Terrestrial Radio Access) standards.

In addition to the foregoing wireless access technologies, other example wireless access technologies include the CDMA 2000 (Code Division Multiple Access 2000) technology, as defined by 3GPP2; the WiMAX (Worldwide Interoperability for Microwave Access) technology, as defined by IEEE 802.16; or others.

A coverage area of a wireless communications network (employing any of the foregoing wireless access technologies) includes an arrangement of cells, where each cell refers to a specific region within the coverage area that includes a wireless access network node (e.g. a base station) that is able to wirelessly communicate with mobile devices in the cell. As used here, a "cell" can refer to an entire cell (which can have multiple sectors), or a given cell sector, or any other segment of an entire cell.

In a communication between a mobile device and a wireless access network node, data units can be sent between the mobile device and wireless access network node. A "data unit" refers to a segment of data that is exchanged between respective protocol layers of the mobile device and the wireless access network equipment, such as the base station or radio network controller. In some examples, such a layer can include a radio link control (RLC) layer, which is responsible for controlling a radio link, for example error recovery and data flow control in a wireless access network. As discussed further below, each of the mobile device and wireless access network node further includes other layers above and below the RLC layer. The protocol layers within a given wireless node (mobile device or wireless access network node) make up a communications stack to allow for communications between the given wireless node and another wireless node.

In the present discussion, reference is made to the RLC layer used in wireless nodes that operate according to the LTE protocol, and in particular according to the 3GPP 36.322 standard. However, note that in other examples, techniques or mechanisms according to some implementations can be applied in wireless communications networks that employ other wireless technologies, which may employ an RLC layer or other type of layer that provides for error recovery and data flow control.

An RLC layer (or other layer) may employ an acknowledged mode of operation, in which a receiver (the receiving wireless node) of a data unit can send an acknowledgement to a transmitter (the transmitting wireless node) of the data unit regarding receipt or decoding of the data unit. Note that the acknowledgment can be a positive acknowledgment or a negative acknowledgment. In cases where a receiver fails to receive a data unit, or where the receiver is unable to correctly decode the data unit, the receiver can send a negative acknowledgement to the transmitter. Receipt of a negative acknowledgement by the transmitter causes the RLC layer in the transmitter to retransmit the data unit. The transmitter can be one of a mobile device and the wireless access network node (e.g. base station), while the receiver can be the other of the mobile device and the wireless access network node.

In the ensuing discussion, reference is made to an "RLC entity," which is interchangeably used with "RLC layer." An RLC entity can refer to logic provided in a wireless node to implement the corresponding functionality. An RLC entity can transmit and receive data units. In the ensuing discussion, a "transmitting-side RLC entity" refers to the RLC entity that transmitted a data unit, while a "receiving-side RLC entity" refers to the RLC entity that received the data unit.

In some implementations, a transmitting-side RLC entity can employ a polling procedure, in which the transmitting-side RLC entity sends a poll request to a receiving-side RLC entity under certain conditions. The sending of the poll request from the transmitting-side RLC entity is to trigger the receiving-side RLC entity to return a status report containing negative acknowledgements, positive acknowledgements, or both, of certain data unit(s) previously sent by the transmitter to the receiver. Note that a status report can be a STATUS protocol data unit (PDU), which is an RLC control PDU in some examples. An RLC control PDU carries control information.

When the transmitting-side RLC entity sends a poll request, the transmitting-side RLC entity starts a predefined timer (referred to as a "poll-retransmit timer"). This poll-retransmit timer (also referred to as the t-PollRetransmit timer by the 3GPP 36.322 LTE standard) is configured to count some predefined time interval. Expiration of the poll-retransmit timer causes the transmitting-side RLC entity to perform certain predefined tasks, including considering certain data unit(s) for retransmission, and sending another poll request.

Note that in some examples, a poll request is provided by setting a poll indicator (e.g. a poll bit) of a data unit to a predetermined value. If the poll indicator of a given data unit is set to the predetermined value (e.g. poll bit is set to "1"), then the receiving-side RLC entity treats the given data unit as including a poll request. On the other hand, if the poll indicator of the given data unit is not set to the predetermined value, then the receiving-side RLC entity does not treat the given data unit as including a poll request.

In certain scenarios, the transmitting-side RLC entity can enter into a stall condition, which is a condition in which the transmitting-side RLC entity has data units waiting for acknowledgment from the receiver, but the transmitting-side RLC entity is unable to send a poll request to the receiver to trigger a status report. Also, under certain conditions, inefficient use of wireless resources (such as uplink resources from the mobile device to the base station) may result from the polling procedure used by the transmitting-side RLC entity.

Additional details regarding the foregoing scenarios are discussed further below.

In accordance with some implementations, techniques or mechanisms are provided to reduce the likelihood of the stall condition and inefficient use of wireless resources noted above. Such techniques or mechanisms can be implemented in the transmitting-side RLC entity, or any other entity involved in performing error recovery and data flow control operations in a wireless node. Generally, techniques or mechanisms according to some implementations provide a predefined criterion (or criteria) that control(s) selection of a data unit to retransmit under certain conditions. The poll bit (or other poll indicator) of the selected data unit is set to specify a polling request. Selection of the data unit for retransmission (with the poll bit set) according to the predefined criterion (or criteria) can reduce the likelihood of the stall condition or inefficient use of wireless resources, or both. In further or alternative implementations, techniques or mechanisms can cause starting of the poll-retransmit timer in response to a status report from the receiver failing to meet a specified criterion—this can also reduce the likelihood of the stall condition noted above. Further details regarding the various techniques or mechanisms are provided below in connection with FIGS. 3-5.

FIG. 1 is a block diagram of an example arrangement that includes a wireless communications network according to the LTE (or EUTRA) protocol. Although reference is made to the LTE protocol in some implementations, note that in alternative implementations, a wireless communications network can operate according to other types of protocols.

A mobile device 100 is able to wirelessly communicate over a wireless link with a wireless access network 102, which can include a base station 104 (referred to as an eNode B in an LTE wireless access network). Although just one wireless access network 102 and corresponding base station 104 is depicted in FIG. 1, note that a wireless communications network can include multiple wireless access networks and corresponding base stations.

The base station 104 is coupled to a mobility management entity (MME) 106 and a serving gateway 108. The MME 106 is a control node for the LTE wireless communications network. For example, the MME 106 can be responsible for idle mode mobile device tracking and paging procedures. The MME 106 can also be responsible for choosing a serving gateway for a mobile device at initial connection time of handover or cell reselection. The MME 106 can also be responsible for authenticating the user of a mobile device.

The serving gateway 108 routes bearer data packets (containing data such as voice data, web browsing data, etc.). The serving gateway 108 also acts as a mobility anchor during handovers between different wireless access networks.

The serving gateway 108 is coupled to a packet data network (PDN) gateway 110, which provides connectivity between the mobile device 100 and a packet data network 112 (e.g. the Internet, a network that provides various services, and so forth).

Although a specific arrangement of a wireless communications network is depicted in FIG. 1, note that in other implementations, different arrangements can be provided.

Figure 2:
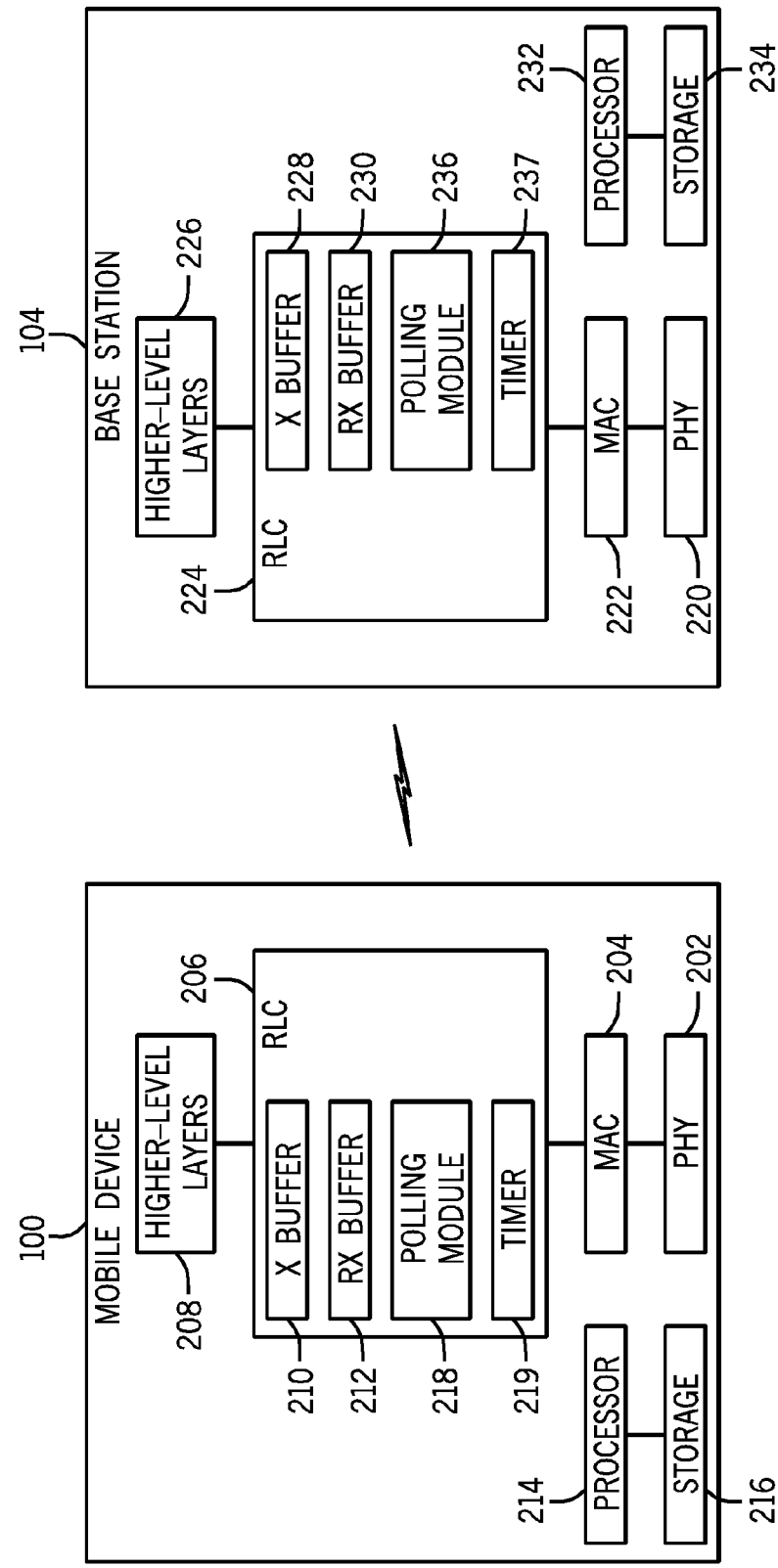
FIG. 2 is a block diagram depicting components in a mobile device and a base station, in accordance with some implementations.

Each of the mobile device 100 and the base station 104 can include an RLC layer (also referred to as an "RLC entity"). FIG. 2 shows various layers in the mobile device 100 and the base station 104. The lowest layer of the mobile device 100 is a physical layer 202, which provides the physical channels used for communication between the mobile device 100 and the base station 104. The layer above the physical layer 202 is a media access control (MAC) layer 204. The MAC layer 204 sends and receives data in frames. A MAC frame can also be referred to as a MAC protocol data unit (PDU). Above the MAC layer 204 is an RLC layer 206 (also referred to as an RLC entity 206). In the outbound direction, the RLC entity 206 passes RLC data units (also referred to as RLC PDUs) to the MAC layer 204, which inserts one or more RLC PDU(s) into each MAC PDU that is to be transmitted by the MAC layer 204. MAC PDUs are then passed to the physical layer 202, which sends the MAC PDUs in physical channels between the mobile device 100 and the base station 104.

Higher-level layers 208 are provided above the RLC layer 204. These higher-level layers 208 can provide data to the RLC entity 206 to communicate through the MAC layer 204 and physical layer 202 for transmission to the base station 104.

In the inbound direction (where data is received from the base station 104 at the mobile device 100), data from the base station 104 is passed from the physical layer 202 to the MAC layer 204 and to the RLC entity 206 and up to the higher-levels 208.

As further shown in FIG. 2, the RLC entity 206 includes a transmission buffer 210 and a retransmission buffer 212. The transmission buffer 210 stores data units from a higher-level layer 208 waiting for transmission. In some examples, a data unit from a higher-level layer 208 can be referred to as a service data unit (SDU). SDUs in the transmission buffer 210 awaiting transmission are not yet segmented or concatenated into RLC PDUs. In some cases, an SDU can be segmented into multiple segments for provision in more than one RLC PDU. In other cases, multiple SDUs can be concatenated to include in an RLC PDU.

The retransmission buffer 212 stores RLC PDUs that have been transmitted once and may have to be transmitted again. For example, the retransmission buffer 212 stores RLC PDUs for which acknowledgements (either positive acknowledgements or negative acknowledgements) have not yet been received. Other RLC PDUs in the retransmission buffer 212 are those for which negative acknowledgments have been received (such as in a status report), and thus such RLC PDUs have to be retransmitted. An RLC PDU can be removed from the retransmission buffer 212 upon receipt of a positive acknowledgment. An empty retransmission buffer 212 (excluding RLC PDUs awaiting acknowledgments) means that there are no RLC PDUs in the retransmission buffer 212 for which negative acknowledgments have been received.

Note that since techniques or mechanisms according to some implementations are provided in the context of acknowledged mode operation of an RLC entity, the "RLC PDUs" are actually AMD (acknowledged mode data) PDUs. Also, in some examples, reference to "RLC PDU" is reference to an RLC data PDU which includes an AMD PDU or AMD PDU segment in acknowledged mode operation. AMD PDUs and AMD PDU segments are defined in section 6.1.1 of the current technical specification of 3GPP TS 36.322.

The mobile device 100 also includes a processor (or multiple processors) 214. The processor(s) 214 can be coupled to a storage medium (or storage media) 216. One or more of the layers 204, 206 and 208 can be implemented as machine-readable instructions executable on the processer(s) 214. In other examples, one or more of the layers 204, 206, and 208 can be implemented in hardware. The physical layer 202 can be implemented in hardware.

The base station 104 includes a physical layer 220, a MAC layer 222, an RLC entity 224, and higher-level layers 226 that provide similar functionalities as corresponding layers of the mobile device 100 discussed above. The RLC entity 224 in the base station 104 also includes a transmission buffer 228 and a retransmission buffer 230, similar to the transmission buffer 210 and the retransmission buffer 212 of the mobile device 100. Although not shown in FIG. 2, it is noted that the RLC entity 206 or 224 also includes a reception buffer to store received data units.

The base station 104 also includes one or more processors 232 coupled to one or more storage media 234.

As further shown in FIG. 2, the RLC entity 206 of the mobile device 100 further includes a polling module 218 that is configured to implement a polling procedure according to some embodiments. The polling module 218 can perform techniques to reduce the likelihood of a stall condition and to reduce the likelihood of inefficient usage of wireless resources under certain conditions, as discussed above. The RLC entity 206 also includes a poll-retransmit timer 219, which is started when a poll request is sent.

The RLC layer 224 of the base station 104 similarly can include a polling module 236 and a poll-retransmit timer 237, similar to the polling module 218 and poll-retransmit timer 219 in the mobile device 100.

In the ensuing discussion, reference is made to tasks performed by the RLC entity 206 (and the polling module 218) in the mobile device 100. In some implementations, similar tasks can be performed by the RLC entity 224 (and polling module 236) in of the base station 104.

In response to predefined conditions, the polling module 218 sends a poll request (by setting a poll bit in an RLC PDU, for example) to a receiving-side RLC entity (such as the RLC entity 224 of the base station 104). As noted above, sending the poll request triggers the receiving-side RLC entity 224 to send a status report back to the transmitting-side RLC entity 206. The status report contains acknowledgment(s), positive or negative, of certain RLC PDU(s).

In some examples, the predefined conditions (as specified by the 3GPP TS 36.322 standard) that cause the sending of a poll request from the transmitting-side RLC entity include the following. Upon assembly a particular AMD PDU or AMD PDU segment (which is a portion of an AMD PDU that can be transmitted), the polling module 208 (in the transmitting-side of the RLC entity 206) sends a poll request if either of the following conditions is met:

(1) if both the transmission buffer 210 and the retransmission buffer 212 become empty (excluding transmitted RLC data PDUs waiting for acknowledgement after transmission of the particular RLC data PDU); or (2) if no new RLC data PDU can be transmitted after the transmission of the particular RLC data PDU (such as due to window stalling).

An example of window stalling is explained as follows. The transmitting-side RLC entity maintains a sliding window having a predefined maximum window size, where the sliding window is defined by sequence numbers that are included in transmitted RLC PDUs. The sliding window starts at the sequence number (the starting window sequence number) of the oldest transmitted RLC PDU that has not yet been acknowledged. Sequence numbers to be included in RLC PDUs are incremented with successive transmissions of RLC PDUs—new RLC PDUs are allowed to be transmitted until the sequence number exceeds the starting window sequence number by greater than the predefined maximum window size. At this point, a window stall is considered to have occurred. Sending an RLC PDU with a sequence number that is outside the sliding window would result in the receiver being unable to handle the RLC PDU. Receipt of an acknowledgment of the oldest transmitted RLC PDU allows the sliding window to slide up to start at the sequence number of the next oldest unacknowledged RLC PDU.

When the polling module 218 of the transmitting-side RLC entity 206 sends an RLC PDU including a set poll bit (poll bit set to "1"), the transmitting-side RLC entity increments VT(S), which is a variable that holds the value of the sequence number to be assigned for the next RLC PDU to be created. VT(S) can be initially set to zero and is incremented whenever the transmitting-side RLC entity 206 delivers an RLC PDU with sequence number equal VT(S).

After delivering the RLC PDU including the set poll bit to a lower layer (e.g. MAC layer 204), and after incrementing VT(S), a variable POLL_SN is set equal to VT(S)-1; effectively, the variable POLL_SN holds the sequence number of the most recently transmitted RLC PDU with the poll bit set. Stated differently, VT(S)-1 represents the largest sequence number from among sequence of data units transmitted so far by the transmitting-side RLC entity 206. As discussed further below, the variable POLL_SN is used to determine whether a status report received from the receiving-side RLC entity provides an acknowledgment of the most recently transmitted RLC PDU with the poll bit set.

Transmission of the RLC PDU with the set poll bit also causes triggering of the poll-retransmit timer 219. If the poll-retransmit timer 219 is not running, then the poll-retransmit timer 219 is started in response to delivering the RLC PDU with the set poll bit to a lower layer. However, if the poll-retransmit timer 219 is already running, then the poll-retransmit timer 219 is restarted, which means that the already running poll-retransmit timer 219 is reset to start counting from its initial value (e.g. zero or any other predefined initial value).

The poll-retransmit timer 219 is used to count a predefined time interval during which reception of a status report from the receiving-side RLC entity (e.g. 224 in the example discussed) is expected. Upon reception of a status report from the receiving-side RLC entity 224, the transmitting-side RLC entity 206 performs the following tasks. If the status report contains a positive or negative acknowledgement for the RLC PDU with sequence number equal to POLL_SN (which means that an acknowledgement has been received for the RLC PDU that is the subject of the poll request that was most recently sent), then if the poll-retransmit timer 219 is running, the poll-retransmit timer 219 is stopped and reset.

However, if the poll-retransmit timer 219 expires without receiving a status report from the receiving-side RLC entity 224, then the transmitting-side RLC entity 206 performs certain predefined tasks. According to current LTE standards, including 3GPP TS 36.322, the following actions occur upon expiration of the poll-retransmit timer 219 (t-PollRetransmit timer):
  (a) If both the transmission buffer and the retransmission buffer are empty (excluding transmitted RLC data PDU awaiting for acknowledgements), or
  (b) If no new RLC data PDU can be transmitted (e.g. due to window stalling):
    (1) consider the AMD PDU with sequence number= VT(S)-1 for retransmission; or
    (2) consider any AMD PDU which has not been positively acknowledged for retransmission (note that action (1) or (2) here is performed if either (a) or (b) is true);
  (c) Set a poll bit in a RLC data PDU selected for retransmission.

Use of techniques defined by current LTE standards can result in various issues. Examples of two different issues are discussed below. A first issue involves possible stalling of the transmitting-side RLC entity. A second issue involves inefficient usage of wireless resources (such as wireless resources granted in an uplink channel from the mobile device to the base station).

Stall Condition Avoidance

An example scenario of the first issue (stall condition) is provided below. It is assumed that RLC PDUs having sequence numbers 0, 1, 2, and 3 have been transmitted by the transmitting-side RLC entity. It is also assumed that no acknowledgments of these RLC PDUs have been received so far.

The next RLC PDU to be transmitted has sequence number 4. After assembly of the next RLC PDU with sequence number 4, both transmission and retransmission buffers and become empty (excluding transmitted RLC PDUs waiting for acknowledgements). The transmitting-side RLC entity sets the poll bit in the RLC PDU with sequence number 4.

After delivering the RLC PDU with sequence number 4 to a lower layer, the transmitting-side RLC entity starts the poll-retransmit timer. VT(S) is incremented (4+1=5). It is assumed that no status report is received, which results in the poll-retransmit timer expiring.

As noted above, according to the current version of 3GPP 36.322 (version 9.3.0), upon expiration of the poll-retransmit timer, the transmitting-side RLC entity considers a RLC PDU for retransmission according to the following:
  (1) consider the AMD PDU with sequence number= VT(S)-1 for retransmission; or
  (2) consider any AMD PDU which has not been positively acknowledged for retransmission.

As an example, the RLC PDU with sequence number equal to a variable VT(A) is considered for retransmission. The variable VT(A) holds the value of the sequence number of the next RLC PDU for which a positive acknowledgment is to be received in sequence. In the foregoing example, it is assumed that VT(A) is equal to the sequence number 0. The transmitting-side RLC entity then triggers a procedure to request an uplink grant from the base station (note that an uplink grant is a grant of uplink resources to the mobile device to allow the mobile device to send data over the uplink resources to the base station).

Delivery of the RLC PDU having sequence number 0 for retransmission to a lower layer causes starting or restarting of the poll-retransmit timer. While waiting for the uplink grant, transmitting-side RLC entity receives a status report (STATUS PDU) including a positive acknowledgement for the RLC PDU with sequence number 0. In response, the transmitting-side RLC entity removes the positively acknowledged RLC PDU with sequence number 0 from the retransmission buffer. Both transmission and retransmission buffers still remain empty except for RLC PDUs waiting for acknowledgement.

At this point, the mobile device has received the uplink grant for retransmission of the RLC PDU with sequence number 0. However, as noted above, the RLC PDU with sequence number 0 has already been acknowledged and thus removed from the retransmission buffer. As a result, since there is no RLC PDU available for sending to a lower layer (e.g. MAC layer), the poll-retransmit timer is not restarted. Since the MAC layer in the mobile device has no data to send, the MAC layer may simply send a MAC PDU with padding (null data) on the granted uplink resources.

In the present example, the transmitting-side RLC entity still has RLC PDUs with sequence numbers 1, 2, 3, and 4 waiting for a positive or negative acknowledgment. However, there is no trigger mechanism at this point to allow the transmitting-side RLC entity to send a poll request since the poll-retransmit timer has not been restarted, resulting in stalled operation.

In the foregoing example, it can be seen that the stall condition is caused by the transmitting-side RLC entity selecting an RLC PDU with a lower sequence number (0 in the example above) for retransmission. If an RLC PDU with a lower sequence number is selected, the receiving-side RLC entity may not be notified of the full range of missing RLC PDUs, which results in reduced transmission efficiency in transmission. Moreover, as noted above, if a selected RLC PDU is positively acknowledged while waiting for an uplink grant, the poll-retransmit timer is not started, which can result in the stall condition.

According to some embodiments, to reduce the likelihood of the stall condition, instead of considering any RLC PDU which has not been positively acknowledged for retransmission, the polling module 218 in the transmitting-side RLC entity 206 uses a predefined criterion that controls selection of an RLC PDU for retransmission as follows:
  consider a AMD PDU with a sequence number (SN) that is closest to VT(S) that has not been acknowledged for retransmission, where $VT(A) \leq SN \leq VT(S)-1$.

In other words, the predefined criterion that controls selection of an RLC PDU for retransmission causes selection of an RLC PDU (that has not yet been acknowledged) having a larger sequence number than sequence numbers of other RLC PDUs that have not yet been acknowledged. More specifically, the RLC PDU (that has not yet been acknowledged) selected for retransmission is the RLC PDU having a largest sequence number among the sequence numbers of the multiple unacknowledged RLC PDUs (that are awaiting acknowledgment) in the retransmission buffer 212 of FIG. 2 (assuming the mobile device 100 is the transmitter).

By retransmitting the available RLC PDU with the largest sequence number, the likelihood of the receiver detecting a missing RLD PDU and triggering sending of a status report back to the transmitter is increased. This status report would include negative acknowledgment(s) for missing RLC PDU(s). In the example scenario provided above, if the RLC PDU selected for retransmission (with the poll bit set) has the sequence number 3 (instead of 0 in the example scenario given above), the receiver may produce a status report prior to expiration of the poll-retransmit timer 219 that may include negative acknowledgments for RLC PDUs having sequence numbers 1 and 2—his would then cause the transmitting-side RLC entity 206 to consider the RLC PDUs having sequence numbers 1 and 2 for retransmission. As a result, more efficient RLC operation can be realized and a temporary stall condition can be avoided.

Figure 3:
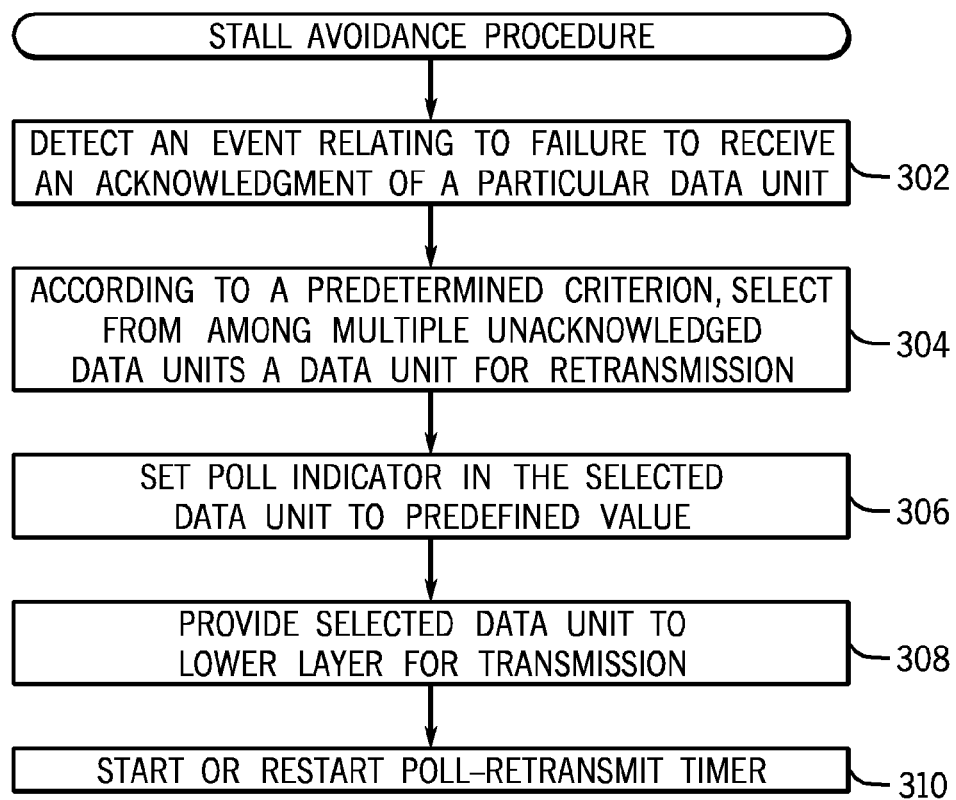
FIGS. 3 and 4 are flow diagrams of processes according to some implementations to reduce likelihood of a stall condition at a transmitter.

FIG. 3 is a flow diagram of a process according to the foregoing technique for a stall avoidance procedure. The process of FIG. 3 can be performed by an entity in a transmitter, such as the transmitting-side RLC entity 206 (and more particularly the polling module 218). The process includes detecting (at 302) an event relating to failure to receive an acknowledgement of a particular data unit (e.g. RLC PDU) sent by the transmitting-side RLC entity. The detected event can be expiration of the poll-retransmit timer 219, or the detected event can be another event.

According to a predefined criterion, the process selects (at 304) from among multiple unacknowledged data units (e.g. RLC PDUs in the retransmission buffer 212 for which acknowledgments have not been received), a data unit for retransmission. The predefined criterion specifies that the selected data unit has a sequence number that is larger than sequence number of others of the multiple unacknowledged data units. In some implementations, the predefined criterion specifies that the selected data unit has a sequence number that is the largest of the sequence numbers of the multiple unacknowledged data units.

The process then sets (at 306) the poll indicator (e.g. poll bit) in the selected data unit to a predetermined value to indicate that the selected data unit contains a poll request. The selected data unit is then provided (at 308) to a lower layer (e.g. MAC layer 204) for transmission.

At this point, the poll-retransmit timer 219 is started or restarted (at 310), as discussed further above. Since the selected data unit has a larger (or largest) sequence number from among multiple sequence numbers, it is likely that the receiver would be able to detect missing data units and send a status report back to the transmitter containing negative acknowledgments of the missing data units, which in turn triggers the transmitter to send corresponding poll request(s). In this way, the likelihood of a stall condition (in which the transmitter is unable to send another poll request) is reduced.

More specifically, according to some examples, a current version of the 3GPP TS 36.322 (version 9.3.0) standard can be updated as follows (the underlined text below contains the update):

Upon expiration of the poll-retransmit timer 219 (t-Poll-Retransmit timer):
(a) If both the transmission buffer and the retransmission buffer are empty (excluding transmitted RLC data PDU awaiting for acknowledgements), or
(b) If no new RLC data PDU can be transmitted (e.g. due to window stalling):

(1) consider the AMD PDU with sequence number= VT(S)-1 for retransmission; or
(2) consider the available AMD PDU with highest sequence number which has not been positively acknowledged for retransmission (note that action (1) or (2) here is performed if either (a) or (b) is true);
(c) Set a poll bit in an RLC data PDU selected for retransmission.

In some examples, the section of a current version of the 3GPP TS 36.322 standard updated is section 5.2.2.3—however, note that this is provided for purposes of example only, since future versions of the 3GPP TS 36.322 standard may have different section numbers and may even be referred to by a different specification.

In alternative examples, section 5.2.2.3 can be updated as follows:

Upon expiration of the poll-retransmit timer 219 (t-Poll-Retransmit timer):
(a) If both the transmission buffer and the retransmission buffer are empty (excluding transmitted RLC data PDU awaiting for acknowledgements), or
(b) If no new RLC data PDU can be transmitted (e.g. due to window stalling):
(1) if the AMD PDU with sequence number=VT(S)-1 is available, consider that AMD PDU with sequence number=VT(S)-1 for retransmission;
else:
(2) consider any AMD PDU which has not been positively acknowledged for retransmission (note that action (1) or (2) here is performed if either (a) or (b) is true);
(c) Set a poll bit in an RLC data PDU selected for retransmission.

The foregoing provides that, in response to expiration of the poll-retransmit timer, the RLC PDU that holds the largest sequence number from among sequence numbers of all RLC PDUs transmitted by the transmitting-side RLC PDU is to be selected (the RLC PDU containing sequence number VT(S)-1 is to be selected) if such RLC PDU is available; if such RLC PDU not available, then any RLC PDU is selected for retransmission.

Figure 4:
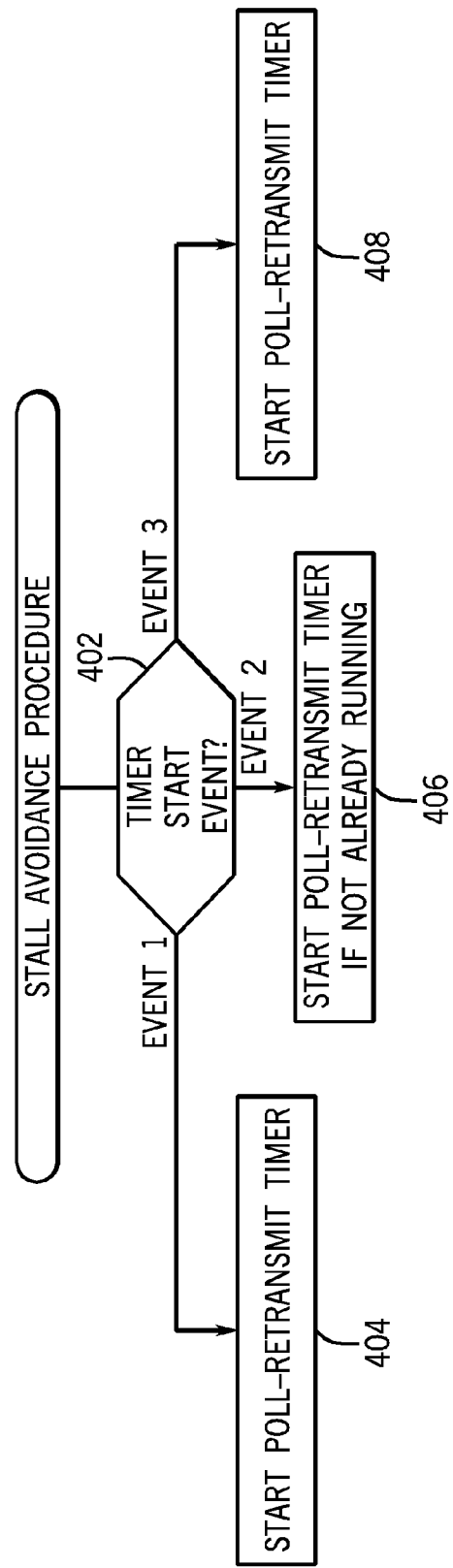

FIG. 4 is a flow diagram of a process for a stall avoidance procedure, according to alternative embodiments. The process of FIG. 4 can be performed by an entity in the transmitter, such as the transmitting-side RLC entity 206, and more particularly the polling module 218. Generally, the process of FIG. 4 detects various events (identified as Event 1, Event 2, and Event 3) that are to cause starting (or restarting) of the poll-retransmit timer 219 in the transmitter. Starting (or restarting) the poll-retransmit timer 219 in response to any of the depicted events reduces the likelihood that a trigger is not present in the transmitter for sending a poll request.

The process includes determining (at 402) whether any of the events (Event 1, Event 2, or Event 3) has occurred.

Event 1 represents a scenario in which the transmitter (e.g. transmitting-side RLC entity 206) does not have a particular data unit (e.g. RLC PDU) in the retransmission buffer 212 available to send to a lower layer. This may have occurred due to receipt of a positive acknowledgment of the sequence number of the particular RLC PDU while the transmitting-side RLC entity 206 is awaiting an uplink grant. Due to the positive acknowledgment, the particular RLC PDU is removed from the retransmission buffer 212, and the poll-transmit timer 219 is stopped. As a result, since the transmitting-side RLC entity 206 is unable to send the particular RLC PDU (with poll bit set) to the lower layer, the poll-transmit timer 219 is not started again, which can result in the stall condition.

In accordance with some embodiments, upon detecting Event 1, the process of FIG. 4 starts (at 404) the poll-retransmit timer 219, even though the transmitting-side RLC entity 206 does not have an available RLC PDU in the retransmission buffer 212 to send to a lower layer. This increases the likelihood that the transmitting-side RLC entity 206 would be able to send a poll request upon the next expiration of the poll-retransmit timer 219. Note that, in response to Event 1, the process can also reselect another RLC PDU for retransmission.

In some examples, the section of a current version of the 3GPP TS 36.322 standard (version 9.3.0) updated to handle Event 1 as discussed above is section 5.2.2.1—however, note that this is provided for purposes of example only, since future versions of the 3GPP TS 36.322 standard may have different section numbers and may even be referred to by a different specification. In some examples, the text added to section 5.2.2.1 of 3GPP TS 36.322 is the following:

If the RLC data PDU including a poll is not available for delivery to a lower layer, perform tasks of section 5.2.2.3 (of 3GPP TS 36.322).

Event 2 represents the scenario where a received status report (e.g. STATUS PDU) including an acknowledgement for a given data unit having a particular sequence number does not satisfy a predefined condition. Note that the status report can include multiple acknowledgments, which can be positive acknowledgements or negative acknowledgements or both, for multiple data units that have respective sequence numbers.

Event 2 involves determining whether the particular sequence number (associated with the acknowledgment in the status report) is unequal to the variable POLL_SN. The variable POLL_SN holds the sequence number of the most recently transmitted RLC PDU with the poll bit set; more generally, the variable POLL_SN is equal to a largest sequence number from among sequence numbers of data units that have been transmitted by the transmitter. In response to detecting that the particular sequence number associated with the acknowledgment (positive or negative) in the status report is not equal to POLL_SN, the process of FIG. 4 starts (at 406) the poll-retransmit timer 219 if the poll-retransmit timer 219 is not already running. Note that if the particular sequence number associated with the acknowledgment in the status report is equal to POLL_SN, the poll-retransmit timer 219 is stopped and reset, as discussed further above.

In some examples, the section of a current version of the 3GPP TS 36.322 (version 9.3.0) standard updated to handle Event 2 as discussed above is section 5.2.2.2—however, note that this is provided for purposes of example only, since future versions of the 3GPP TS 36.322 standard may have different section numbers and may even be referred to by a different specification. In some examples, section 5.2.2.2 is updated as follows (the underlined text is the newly added text):

Upon reception of a STATUS report from the receiving RLC AM entity the transmitting side of an AM RLC entity shall:
(a) if the STATUS report comprises a positive or negative acknowledgement for the RLC data PDU with sequence number equal to POLL_SN:
if t-PollRetransmit is running:
stop and reset t-PollRetransmit;
(b) else:
if t-PollRetransmit is not running:
start t-pollRetransmit.

Event 3 represents detection of expiration of the poll-retransmit timer 219. upon detection of the expiration of the poll-retransmit timer 219, the process of FIG. 4 starts (at 408) the poll-retransmit timer 219.

In some examples, the section of a current version of the 3GPP TS 36.322 standard (version 9.3.0) updated to handle Event 3 as discussed above is section 5.2.2.3—however, note that this is provided for purposes of example only, since future versions of the 3GPP TS 36.322 standard may have different section numbers and may even be referred to by a different specification. In some examples, section 5.2.2.3 is updated as follows (the underlined text is the newly added text):

Upon expiry of t-PollRetransmit, the transmitting-side RLC entity shall:
(a) if both the transmission buffer and the retransmission buffer are empty (excluding transmitted RLC data PDU awaiting for acknowledgements); or
(b) if no new RLC data PDU can be transmitted (e.g. due to window stalling):
(1) consider the AMD PDU with SN=VT(S)-1 for retransmission; or
(2) consider any AMD PDU which has not been positively acknowledged for retransmission;
(c) include a poll in a RLC data PDU as described in section 5.2.2.1;
(d) start t-PollRetransmit.

The FIG. 4 process is able to reduce the likelihood of a stall condition occurring due to an inability to submit an unacknowledged RLC PDU to a lower layer due to the unacknowledged RLC PDU being acknowledged while the transmitter is waiting for an uplink grant.

Inefficient Resource Usage Avoidance

As discussed further above, a second issue resulting with procedures handled by some transmitting-side RLC entities involves inefficient usage of wireless resources (such as wireless resources granted in an uplink channel from the mobile device to the base station). An example scenario involving this second issue is provided below.

In this example scenario, it is assumed that the transmitting-side RLC entity has transmitted RLC PDUs with sequence numbers 0, 1, 2, and 3. No positive or negative acknowledgment has been received from the receiver for any of these RLC PDUs.

The next RLC PDU to be transmitted has sequence number 4. After assembly of the next RLC PDU with sequence number 4, it is assumed that both the transmission and retransmission buffers have become empty (excluding transmitted RLC PDUs waiting for acknowledgements). The transmitting-side RLC entity sets the poll bit in the RLC PDU with sequence number 4.

After delivering the RLC PDU having sequence number 4 to a lower layer, the transmitting-side RLC entity starts the poll-retransmit timer. The variable VT(S) is incremented (4+1=5).

The receiving-side RLC entity receives the RLC PDU with sequence number 4 and with the poll bit set. As a result the receiving-side RLC entity responds by transmitting a status report (e.g. STATUS PDU) including negative acknowledgments for sequence numbers 0 to 3 and a positive acknowledgment for sequence number 4 (which is equal to VT(S)-1).

Upon reception of the STATUS PDU, the transmitting-side RLC entity stops the poll-retransmit timer and removes the RLC PDU with sequence number 4 from the retransmission buffer and considers RLC PDUs having sequence numbers 0 to 3 for retransmission.

The transmitting-side RLC entity retransmits RLC PDUs with sequence numbers 0 to 3. After assembly of the RLC PDU with sequence number 3, it is assumed that both transmission and retransmission buffers become empty (excluding transmitted RLC PDUs waiting for acknowledgements). As a result, the transmitting-side RLC entity sets the poll bit in the RLC PDU with sequence number 3.

After delivering the RLC PDU with sequence number 3 to a lower layer, the transmitting-side RLC entity starts the poll-retransmit timer. If no status report is received, the poll-retransmit timer expires.

Upon expiration of the poll-retransmit timer, the transmitting-side RLC entity may consider any RLC PDU which has not been positively acknowledged for retransmission since the RLC PDU with sequence number VT(S)-1=4 has already been positively acknowledged and removed from the retransmission buffer. It is assumed that the transmitting-side RLC entity considers the unacknowledged RLC PDU with sequence 2 for retransmission. This triggers the transmitter to request an uplink grant. The RLC PDU with sequence number 2 is delivered to a lower layer, which starts the poll-retransmit timer.

While waiting for an uplink grant, the transmitting-side RLC entity receives a status report, which positively acknowledges the RLC PDU with sequence number 2. This causes the RLC PDU with sequence number 2 to be removed from the retransmission buffer. At this point, the RLC PDU with sequence number 2 is not available to send in the resources granted by the uplink grant.

However, the transmitting-side RLC entity can consider the RLC PDU with sequence number 0, 1 or 3 for retransmission on the granted uplink resources. It is assumed that the transmitting-side RLC entity decides to use the granted uplink resources to retransmit the RLC PDU with sequence number 0.

If the size of RLC PDU with sequence number 0 is larger than the RLC PDU with sequence number 2, the RLC PDU with sequence number 0 may have to be segmented. This is due to the fact that the transmitter had asked for a grant of uplink resources that are sufficient to send the RLC PDU with sequence number 2. Such uplink resources would not be sufficient to transmit the larger RLC PDU with sequence number 0. As a result, the larger RLC PDU with sequence number 0 has to be segmented into multiple segments, with a subset of the multiple segments sent on the granted uplink resources. Having to segment the RLC PDU with sequence number 0 is inefficient—it is thus desirable to avoid having to segment an RLC PDU when transmitting the RLC PDU to the receiver.

Figure 5:
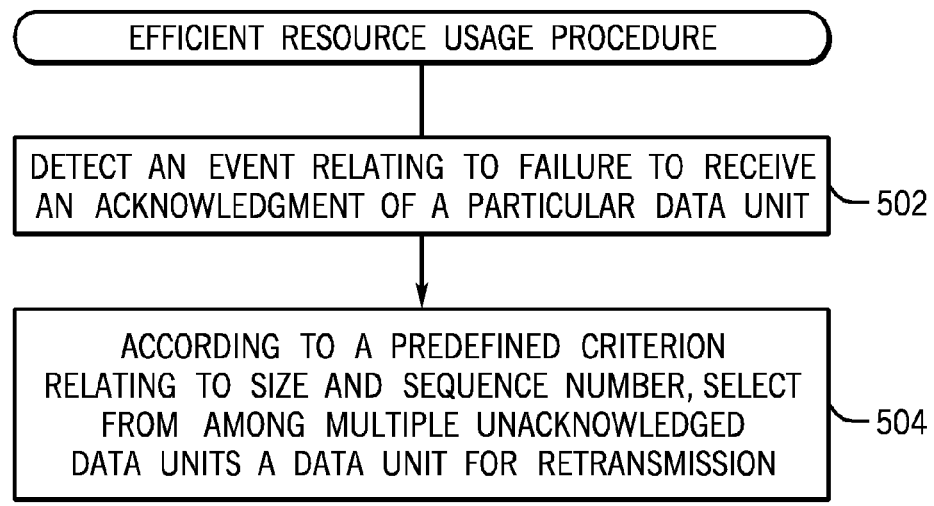
FIG. 5 is a flow diagram of a process according to some implementations of a procedure to improve efficiency of wireless resource usage.

FIG. 5 is a flow diagram of a process to allow for more efficient usage of granted uplink resources. The process, which can be performed by the transmitting-side RLC entity 206 (and more specifically by the polling module 218), detects (at 502) an event relating to failure to receive an acknowledgement of a particular data unit sent by the transmitting-side RLC entity. Such event can be expiration of the poll-retransmit timer 219, for example.

According to a predefined criterion, the process of FIG. 5 selects (at 504) from multiple unacknowledged data units (e.g. RLC PDUs in the retransmission buffer 212 awaiting acknowledgment), a data unit for retransmission, where the predefined criterion specifies selection of a data unit according to size, and specifies selection of a data unit that has a sequence number that is smaller than sequence numbers of others of the multiple unacknowledged data units. The predefined criterion thus relates to both a size of the data unit and a sequence of the data unit.

In some implementations, the predefined criterion relating to size can specify that a largest (size) data unit among the multiple unacknowledged data units is to be selected. In alternative implementations, the predefined criterion relating to size specifies that a data unit having a largest number of data segments from a higher-level layer 208 of the mobile device 100 is to be selected. In some examples, the data segments from the higher-level layer 208 can be SDUs (service data units). In other examples, other types of data segments can be received by the RLC entity 206 from the higher-level layer 208.

In further implementations, the predefined criterion relating to sequence number can specify selection of a data unit that has a sequence number that is the smallest of the sequence numbers of the multiple unacknowledged data units.

In some examples, section 5.2.2.3 of can be modified (the underlined text contains the modified portion) of 3GPP 36.322 in one of the following two ways. However, note that this is provided for purposes of example only, since future versions of the 3GPP TS 36.322 standard may have different section numbers and may even be referred to by a different specification.

The first modification is set forth below:
Upon expiration of the poll-retransmit timer 219 (t-Poll-Retransmit), the transmitting-side RLC entity performs:
(a) If both the transmission buffer and the retransmission buffer are empty (excluding transmitted RLC data PDU awaiting for acknowledgements), or
(b) If no new RLC data PDU can be transmitted (e.g. due to window stalling):
  (1) consider the AMD PDU with sequence number= VT(S)-1 for retransmission; or
  (2) consider the largest size AMD PDU with the smallest sequence number which has not been positively acknowledged for retransmission (note that action (1) or (2) here is performed if either (a) or (b) is true);
(c) Set a poll bit in an RLC data PDU selected for retransmission.

The second modification is set forth below:
Upon expiration of the poll-retransmit timer 219 (t-Poll-Retransmit), the transmitting-side RLC entity performs:
(a) If both the transmission buffer and the retransmission buffer are empty (excluding transmitted RLC data PDU awaiting for acknowledgements), or
(b) If no new RLC data PDU can be transmitted (e.g. due to window stalling):
  (1) consider the AMD PDU with sequence number= VT(S)-1 for retransmission; or
  (2) consider the AMD PDU with the smallest sequence number which has not been positively acknowledged for retransmission and contains the largest number of RLC SDU segments (note that action (1) or (2) here is performed if either (a) or (b) is true);
(c) Set a poll bit in an RLC data PDU selected for retransmission.

The various modules (such as those depicted in FIG. 2) can be implemented as machine-readable instructions that are loaded for execution on a processor(s) (such as 214 or 232 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method performed by a first wireless node, comprising:
   detecting an event relating to failure to receive an acknowledgment of a particular data unit transmitted by the first wireless node; and
   according to a predefined criterion, selecting, from a plurality of unacknowledged data units, a data unit for retransmission, wherein the predefined criterion specifies that the selected data unit has a sequence number that is larger than sequence numbers of others of the plurality of unacknowledged data units, wherein selecting according to the predefined criterion comprises determining which of the plurality of unacknowledged data units has the sequence number larger than the sequence numbers of the others of the plurality of unacknowledged data units.

2. The method of claim 1, wherein the predefined criterion specifies that the selected data unit has a sequence number that is a largest of the sequence numbers of the plurality of unacknowledged data units.

3. The method of claim 1, wherein detecting the event relating to the failure to receive the acknowledgment comprises detecting expiration of a timer.

4. The method of claim 3, further comprising starting the timer in response to the first wireless node sending a poll request to trigger a second wireless node to provide acknowledgment of one or more data units up to a given unacknowledged data unit.

5. The method of claim 4, wherein the poll request is specified by setting a poll indicator in a data unit to a predefined value, and wherein starting the timer is triggered by sending the data unit having the poll indicator from a radio link control layer to a lower layer in the first wireless node.

6. The method of claim 4, further comprising:
   receiving a status report responsive to the poll request, the status report containing an acknowledgment up to the given unacknowledged data unit; and
   stopping the timer in response to receiving the status report.

7. The method of claim 4, further comprising:
   receiving a status report responsive to the poll request, the status report containing an acknowledgment for a sequence number unequal to a sequence number of the given unacknowledged data unit; and
   in response to the status report containing the acknowledgement for a sequence number unequal to the sequence number of the given unacknowledged data unit, starting the timer if the timer is not running.

8. The method of claim 1, wherein selecting, from the plurality of unacknowledged data units, the data unit for retransmission comprises selecting, from a plurality of radio link control (RLC) protocol data units (PDUs), an RLC PDU for retransmission.

9. The method of claim 8, wherein the plurality of RLC PDUs comprise a plurality of RLC acknowledged mode data PDUs.

10. The method of claim 1, further comprising communicating, by the first wireless node, according to an Evolved Universal Terrestrial Radio Access protocol.

11. The method of claim 1, further comprising setting a poll indicator in the selected data unit to a predefined value, wherein transmission of the selected data unit with the poll indicator set to the predefined value is an indication to a receiver of the selected data unit that the receiver is to respond with a status report acknowledging one or more data units up to the selected data unit.

12. The method of claim 1, wherein the predefined criterion specifies selection of a given data unit that contains a largest sequence number among sequence numbers of data units transmitted from the first wireless node, if the given data unit is available, and wherein the predefined criterion further specifies selection of another data unit if the given data unit is not available.

13. The method of claim 1, further comprising:
   incrementing, by the first wireless node, sequence numbers of the respective plurality of unacknowledged data units with successive transmissions of the plurality of unacknowledged data units by the first wireless node.

14. The method of claim 1, wherein an oldest of the plurality of unacknowledged data units has a lower sequence number than a sequence number of a more recent one of the plurality of unacknowledged data units.

15. A wireless node comprising:
   at least one processor to:
      detect an event relating to failure to receive an acknowledgment of a data unit transmitted by the wireless node; and
      in response to detecting the event, select, according to a predefined criterion, a data unit for retransmission, the selected data unit selected according to the predefined criterion from a plurality of unacknowledged data units, wherein the predefined criterion specifies that the selected data unit has a sequence number that is larger than sequence numbers of others of the plurality of unacknowledged data units, wherein selecting according to the predefined criterion comprises determining which of the plurality of unacknowledged data units has the sequence number larger than the sequence numbers of the others of the plurality of unacknowledged data units.

16. The wireless node of claim 15, wherein an oldest of the plurality of unacknowledged data units has a lower sequence number than a sequence number of a more recent one of the plurality of unacknowledged data units.

17. The wireless node of claim 15, wherein the predefined criterion specifies that the selected data unit has a sequence number that is a largest of the sequence numbers of the plurality of unacknowledged data units.

18. The wireless node of claim 15, wherein detecting the event relating to the failure to receive the acknowledgment comprises detecting expiration of a timer.

19. An article comprising at least one non-transitory machine-readable storage medium storing instructions that upon execution cause a wireless node to:
   detect an event relating to failure to receive an acknowledgment of a data unit transmitted by the wireless node; and
   according to a predefined criterion, select, from a plurality of unacknowledged data units, a data unit for retransmission, wherein the predefined criterion specifies that the selected data unit has a sequence number that is larger than sequence numbers of others of the plurality of unacknowledged data units, wherein selecting according to the predefined criterion comprises determining which of the plurality of unacknowledged data units has the sequence number larger than the sequence numbers of the others of the plurality of unacknowledged data units.

20. The article of claim 19, wherein an oldest of the plurality of unacknowledged data units has a lower sequence number than a sequence number of a more recent one of the plurality of unacknowledged data units.

21. The article of claim 19, wherein the predefined criterion specifies that the selected data unit has a sequence number that is a largest of the sequence numbers of the plurality of unacknowledged data units.

22. The article of claim 19, wherein detecting the event relating to the failure to receive the acknowledgment comprises detecting expiration of a timer.

* * * * *